(12) United States Patent
Arndt et al.

(10) Patent No.: US 7,080,608 B1
(45) Date of Patent: Jul. 25, 2006

(54) APPARATUS FOR WASHING ANIMALS

(76) Inventors: Mark S. Arndt, 2806 S. 162nd Plz., Omaha, NE (US) 68130; Jeanne L. Caples, 2806 S. 162nd Plz., Omaha, NE (US) 68130

( * ) Notice: Subject to any disclaimer, the term of this patent is extended or adjusted under 35 U.S.C. 154(b) by 703 days.

(21) Appl. No.: 10/301,925

(22) Filed: Nov. 21, 2002

(51) Int. Cl.
*A01K 13/00* (2006.01)
(52) U.S. Cl. ...................... 119/671; 119/665
(58) Field of Classification Search .......... 119/665, 119/671, 673
See application file for complete search history.

(56) References Cited

U.S. PATENT DOCUMENTS

| | | | | |
|---|---|---|---|---|
| 4,316,433 A | * | 2/1982 | Hebert | 119/673 |
| 4,505,229 A | * | 3/1985 | Altissimo | 119/668 |
| 4,836,144 A | | 6/1989 | Cole | |
| 5,148,771 A | * | 9/1992 | Schuett et al. | 119/479 |
| 5,193,487 A | * | 3/1993 | Vogel | 119/671 |
| 5,213,064 A | * | 5/1993 | Mondine et al. | 119/671 |
| 5,249,930 A | * | 10/1993 | Pacquesi | 417/313 |
| 5,711,252 A | * | 1/1998 | Brandolino | 119/673 |
| 5,738,044 A | * | 4/1998 | Gaylinn | 119/671 |
| 5,794,570 A | * | 8/1998 | Foster et al. | 119/756 |
| 5,842,442 A | * | 12/1998 | Marr | 119/665 |
| 5,845,604 A | * | 12/1998 | Cucchi et al. | 119/673 |

FOREIGN PATENT DOCUMENTS

FR 2625070 A1 * 6/1989

OTHER PUBLICATIONS

New England Serum Company (catalog); www.NESerum.com; 800-NE Serum (800-637-3786); p. 79; approximately Sep. 2002.

* cited by examiner

*Primary Examiner*—Peter M. Poon
*Assistant Examiner*—K. Smith
(74) *Attorney, Agent, or Firm*—Thomte, Mazour & Niebergall; Shane M. Niebergall

(57) ABSTRACT

An apparatus for washing animals is disclosed comprising a container having a bottom surface and a platform spaced vertically from the bottom surface. An animal is positioned on a pad disposed on the platform. The pad and platform are shaped so that the washing liquid runs freely from the pad and platform to the bottom surface of the container. A trough is positioned adjacent the bottom surface of the container for receiving the washing liquid. A trough basket collects hair and other debris to keep the drain clear. An external well is positioned adjacent to the trough to provide an area for receiving a recirculating pump for use in minimizing the use of washing liquid required to wash the animal.

21 Claims, 6 Drawing Sheets

APPARATUS FOR WASHING ANIMALS

BACKGROUND OF THE INVENTION

1. Field of the Invention

The present invention relates to systems for washing and disinfecting animals and more particularly to a system that incorporates the use of a platform, to position the animal above any standing water, along with an arrangement of wells for accumulating washing liquid for recirculation through the system to increase the system's overall efficiency.

2. Description of the Related Art

Various washing stations and tubs are used in the veterinary and commercial pet grooming industries to wash and disinfect a wide variety of animals. These systems typically employ a tub in which the animal can be placed and a source of water or other washing liquid that can be selectively directed to the animal using one of many types of hand sprayers. Such a system is typically provided with a drain, positioned in the bottom of the washing container to dispose of the washing liquid.

Another typical feature of the prior art systems is a horizontal platform disposed within the container for supporting the animal above the standing washing liquid at the bottom of the container. These platforms are typically constructed from a perforated metal or other rigid material to allow washing liquid to drain through the platform to the bottom of the washing container. However, the openings formed in the perforated metal or other rigid material can cause serious injury to the animal if it catches a paw pad or a nail within one of the openings and then suddenly moves its paw. These injuries can be quite serious and often require immediate veterinary assistance. Clearly, an elevated platform is needed that keeps the animal out of the standing washing liquid but provides a safe and comfortable self-draining surface.

Some prior art systems have incorporated the use of a recirculating pump. By placing a recirculating pump in the lower portion of the washing container, the user is allowed to close the drain to the system, partially fill the washing container with the washing liquid, and then wash the animal using a reduced amount of washing liquid. However, these systems pose a number of problems. First, the recirculating pump must be submersed sufficiently within the washing liquid. Accordingly, the user must flood the bottom of the washing container with some quantity of washing liquid. This volume of washing liquid, over the bottom surface area of the standard washing container, prevents the user from achieving the desired significant reduction in the total washing liquid used. Additionally, the recirculating pump is disposed within the washing liquid immediately adjacent the animal, creating the increased likelihood that the animal will kick, bite or otherwise interfere with the recirculating pump and its associated hoses and power cords while the animal is being washed. Accordingly, what is needed is a washing system that can incorporate a recirculating pump in a manner that materially reduces the amount of washing liquid used without increasing the likelihood of injury to the animal or damage to the recirculating pump.

Regardless of whether or not the prior art systems use a recirculating pump in their operation, all prior art systems are forced to deal with the issue of hair and other debris that fall from the animal during the washing operation and, oftentimes, clog the drain or the inlet to the recirculating pump. Thereafter, the user is forced to clean out the drain, the recirculating pump and other portions of the system by hand. A simplified system for collecting the hair and other debris in a simple and quick manner is needed.

SUMMARY OF THE INVENTION

An apparatus for washing animals with a liquid is disclosed comprising at least a container having opposite sides, opposite ends, and a bottom surface. The apparatus is further provided with a platform having opposite sides and ends that is disposed within the container so that the platform is vertically spaced from the bottom surface. A pad is placed on top of the platform to provide a surface on which the animal can sit or stand during a washing operation. The opposite sides and ends of the platform are shaped to provide lips that retain the pad in position on top of the platform but allow the washing liquid to freely flow to the bottom surface of the container. The platform and pad keep the animal out of any standing washing liquid.

In an alternate embodiment, a trough is formed into the bottom of the container so that it extends a select distance below the level of the bottom surface of the container. In this embodiment, the drain for the system is located at the bottom of the trough, and the bottom surface of the container is preferably positioned at an angle so that any washing liquid being introduced to the container will flow freely into the trough. An optional trough basket is provided having a shape and size similar to that of the trough so that it can be disposed snugly therein. The trough basket is comprised of a perforated material having openings sized to allow the washing liquid to pass through but that otherwise retain hair or other debris within the trough basket. Accordingly, the drain is kept virtually hair- and debris-free. The trough basket is simply removed and its contents emptied after a washing operation. The trough is preferably shaped to receive a recirculating pump that can be operatively coupled to a hand-held sprayer, to allow for the washing liquid to be reused throughout a washing operation, thus reducing the amount of washing liquid consumed. The trough design further serves to accumulate the washing liquid so that the recirculating pump is sufficiently submerged without the necessity of a large volume of washing liquid to cover the bottom portion of the container.

In yet another embodiment, an external well is formed into the perimeter of the container adjacent the trough. The external well is formed so that it is in open communication with the trough and is preferably positioned at the same level as the trough, below the bottom surface of the container. The external well is preferably shaped to receive the recirculating pump, thus keeping the pump out of the animal's reach. The trough basket, when disposed within the trough, provides a screening barrier between the trough and the external well to substantially prohibit the transmission of hair or other debris from the trough into the external well. The size and shape of the external well can be predetermined to allow for specific volumes of washing liquid and for different liquid recirculating systems.

It is therefore a principal object of the present invention to provide an improved apparatus for washing animals.

A further object of the present invention is to provide an improved apparatus for washing animals that safely and comfortably positions the animal above any standing washing liquid.

Yet another object of the present invention is to provide an apparatus for washing animals that minimizes the amount of washing liquid used during a washing operation.

Still another object of the present invention is to provide an apparatus for washing animals that provides an easy method of removing hair and other debris from the apparatus after washing the animals.

A further object of the present invention is to provide an apparatus for washing animals that incorporates the use of a recirculating pump and reduces the incidence of contact between the animal and the recirculating pump.

Another object of the present invention is to provide an apparatus for washing animals that inhibits hair and other debris from migrating toward and into the pump of the recirculating bathing system, thus maintaining the efficiency of the pump throughout the washing process, and reducing the maintenance of the pump, specifically the removal of unwanted hair and other debris from the pump and its associated hoses, after the washing process is completed.

Yet another object of the present invention is to provide an apparatus for washing animals that is simple in construction and use that decreases the amount of washing liquid used to wash the animals while increasing their safety and comfort.

These and other objects will be apparent to those skilled in the art.

DESCRIPTION OF THE PREFERRED EMBODIMENT

Figure 1:
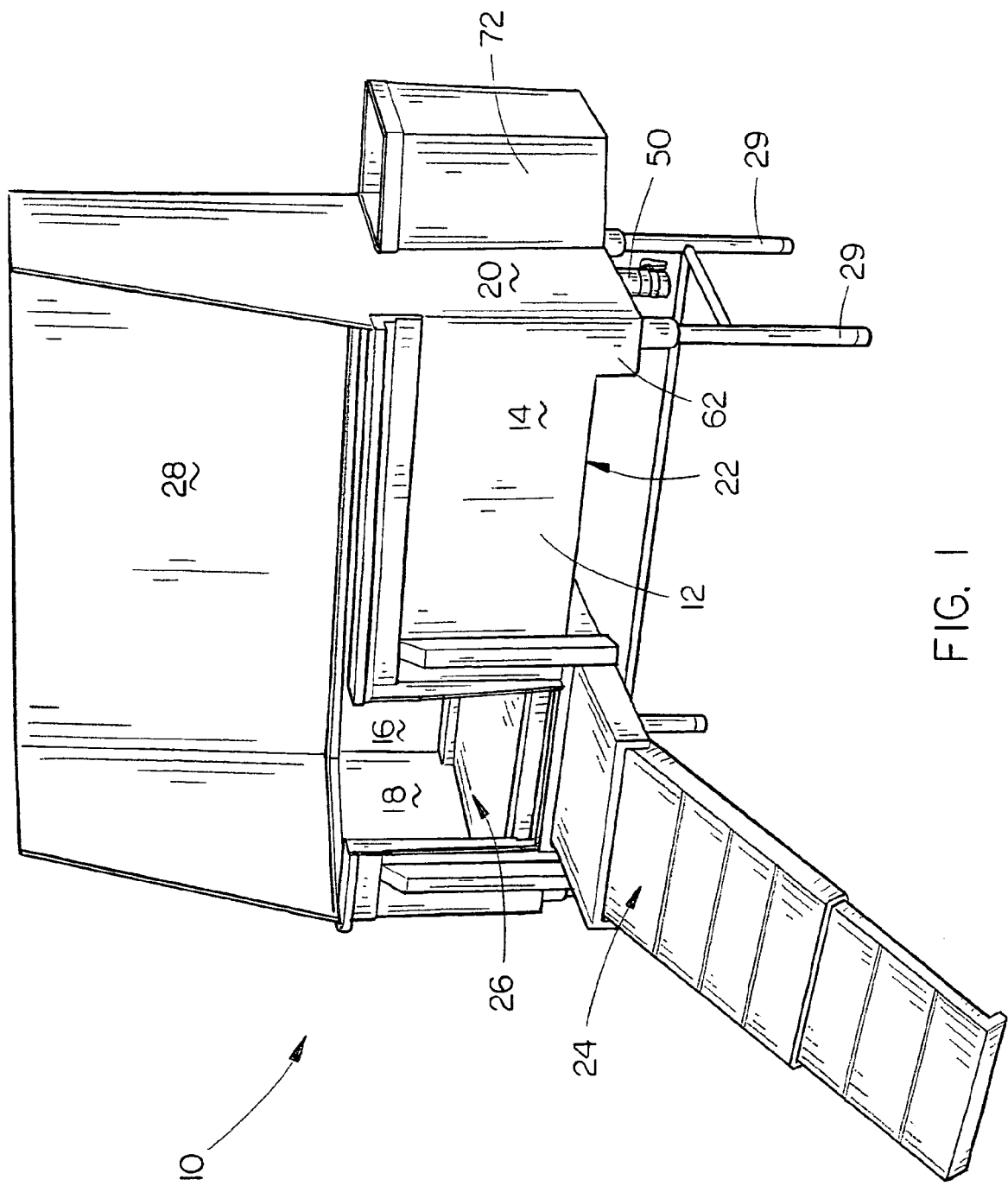
FIG. 1 is a perspective view of a preferred embodiment of the apparatus for washing animals of the present invention.
Figure 2:
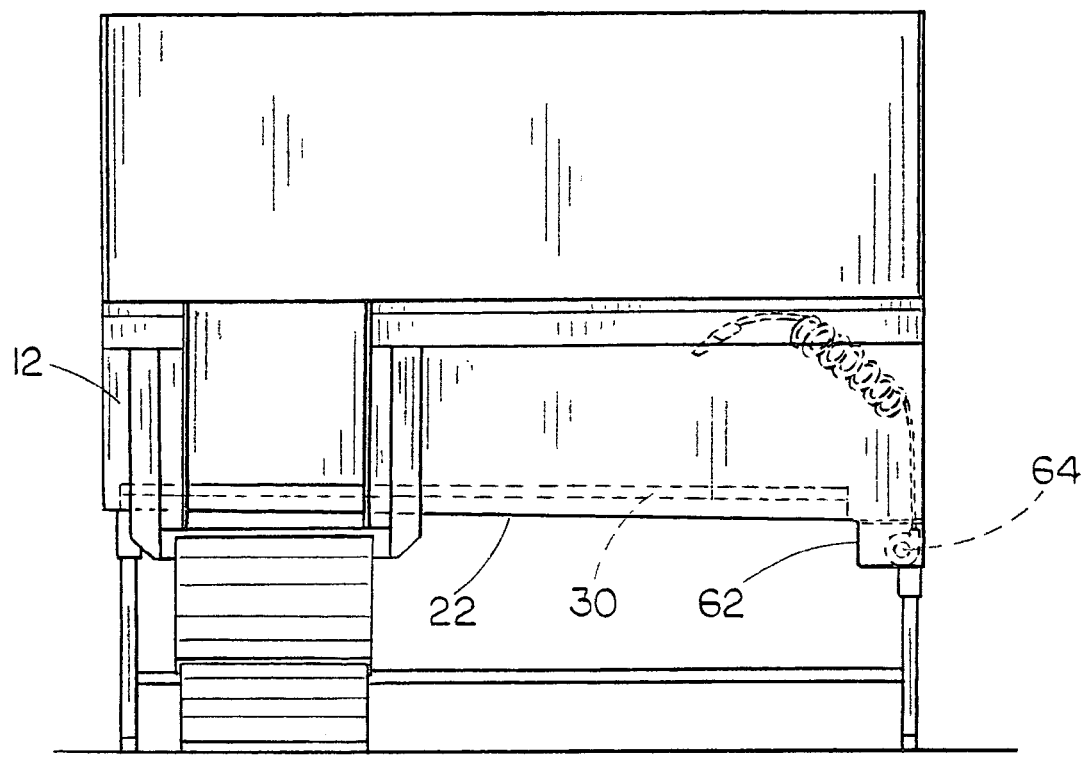
FIG. 2 is a front elevation view of another preferred embodiment of the apparatus for washing animals of the present invention.

The apparatus for washing animals of the present invention is referred to generally by the reference numeral 10 in FIGS. 1–7. The washing apparatus 10 is generally provided with a washing container 12 having opposite side portions 14 and 16, opposite end portions 18 and 20, and a bottom portion 22. The embodiments depicted in FIGS. 1–7 may be depicted with optional structures that may assist the user with one or more contemplated uses of the present invention; however, these structures are not considered to be necessary to the present invention. These structures may include, but are not limited to, an animal ramp 24, an animal passageway 26, a backsplash member 28, and leg members 29. Moreover, although the present invention is shown to have a generally rectangular shape, virtually any shape is contemplated to fit the particular needs and applications of the user, from square, to round, to an oblong shape.

A supporting platform 30 is disposed within the container 12 so that the platform 30 is operatively coupled to, but vertically spaced from, the bottom portion 22. The platform 30 is provided with a generally planar upper surface 32, opposite end portions 34 and 36, and opposite side members 38 and 40. At least one opening 42 is formed in the upper surface 32 of the platform 30. A pad 44 is provided to be coupled to the upper surface 32 of the platform 30. It is preferred that the pad 44 be generally shaped to accommodate the size and shape of the upper surface 32. The pad 44 is preferably formed from a resilient, water-resistant material, such as a closed-cell foam rubber. However, it is contemplated that other natural and synthetic materials may provide a suitable pad for use in the present invention. In a preferred embodiment, however, a closed cell nitrile foam rubber mat is used having a non-slip surface formed in its opposite surfaces. This and similar materials are preferred for their ability to resist stains, odors and liquids. Moreover, these materials resist damage by detergents, disinfectants and bleach. An additional desired feature of the material chosen will be its ability to resist the wear and tear caused by engagement with the animal's feet and nails.

The pad 44 is preferably placed on top of the upper surface 32 of the platform 30 so that the pad 44 can be easily removed for cleaning or replacement purposes. Similarly, it is preferred that the platform 30 be removably coupled to the bottom portion 22 of the container 12. While it is contemplated that the platform could be more permanently secured to the container 12, a greater degree of versatility may be achieved by making the platform 30 removable. In a preferred embodiment, the platform 30 is provided with at least one pair of legs 46 and 48 that extend downwardly from the platform 30 and engage the bottom portion 22 of the container 12. It is contemplated that the legs 46 and 48 could be positioned along the side and/or end portions of the platform 30 as well as being positioned inwardly therefrom. Moreover, the legs 46 and 48 can be formed to be removable, to adjust for different heights, or simply formed integral with the platform 30 for simplicity of manufacture.

The bottom portion 22 of the container 12 is positioned at a slight angle to the horizontal to direct the washing liquid towards the drain 50. Although the drain 50 is generally shown in the figures to be positioned at one end of the washing apparatus 10, it is contemplated that the location of drain 50 could be placed at virtually any location along bottom portion 22 and that the slope of bottom portion 22 could be adjusted to accommodate any such drain location. The slope of the bottom portion 22 of the container 12 will generally be imitated by the slope of platform 30, which is operatively coupled thereto. To prevent the pad 44 from unintentionally sliding off of upper surface 32 of the platform 30, an upwardly projecting lip 52 is provided at the forward end 36 of the platform 30. To prevent the unintentional sliding of the pad 44 beyond the opposite side portions 38 and 40 of the platform 30, upwardly projecting lips 54 and 56 are provided to extend upwardly from end portions 38 and 40, respectively.

In use, as the washing liquid engages the pad 44, it is generally directed by the slope of the pad 44 and the platform 30 toward the forward end 36 of the platform 30. However, it is contemplated that the washing liquid will typically be displaced outwardly along any portion of its peripheral edge 58. The washing liquid is then permitted to flow downwardly to the upper surface 32 of the platform 30. The opening 42 provides an exit for any water that becomes disposed between the pad 44 and the upper surface 32 of the platform 30. It is contemplated that a plurality of such openings could be provided as required in a variety of patterns. It is preferred that the lips 52, 54 and 56 be shaped and oriented with respect to one another to provide at least one opening 60 to allow the washing liquid to freely flow downwardly toward the bottom portion 22 of the container 12.

Figure 6:
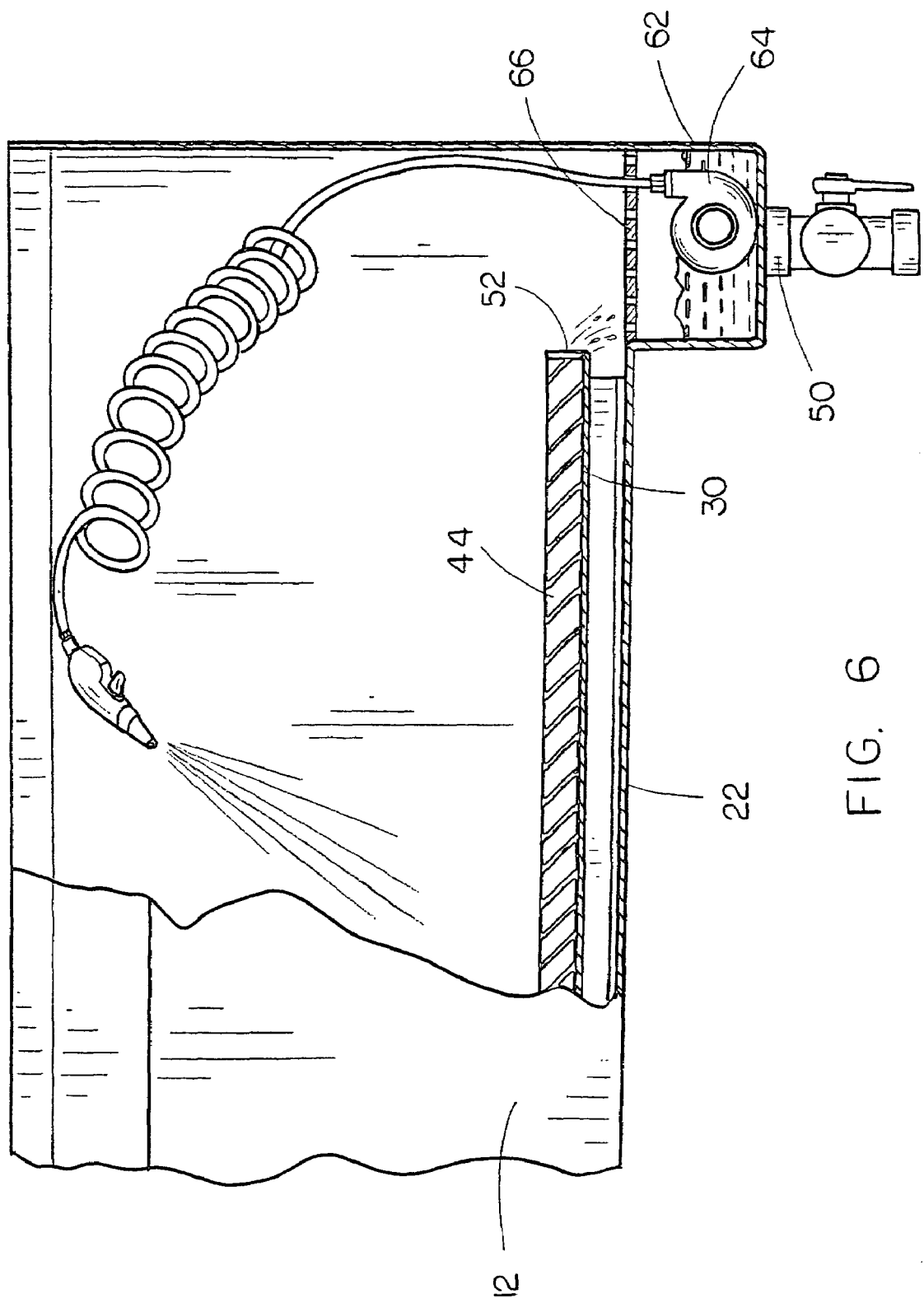
FIG. 6 is a partial cutaway view of the apparatus for washing animals of FIG. 2.

In a preferred embodiment, a trough 62 is formed in the container 12 and positioned lower than the bottom portion 22. The trough 62 forms a receptacle in which the washing liquid collects. Accordingly, it is preferred that the drain 50 be disposed within, or at least in open fluid communication with, the trough 62. Although the trough 62 is depicted in the figures as being positioned at one end of the washing apparatus 10, it is contemplated that the trough 62, like the drain 50, could be positioned at virtually any location along the bottom portion 22 and the slope of bottom portion 22 adjusted accordingly. Furthermore, although the trough 62 is depicted in the figures as extending across the entire width of the washing apparatus 10, it is contemplated that the length, as well as the width and depth of the trough, could be apportioned according to the intended use. It is contemplated, however, that the width and depth of the trough 62 will be provided to accommodate a recirculating pump 64 therein. In this arrangement, as depicted in FIG. 6, the washing liquid is allowed to flow into the trough 62 with sufficient volume to submerse the recirculating pump 64 for operation.

Figure 4:
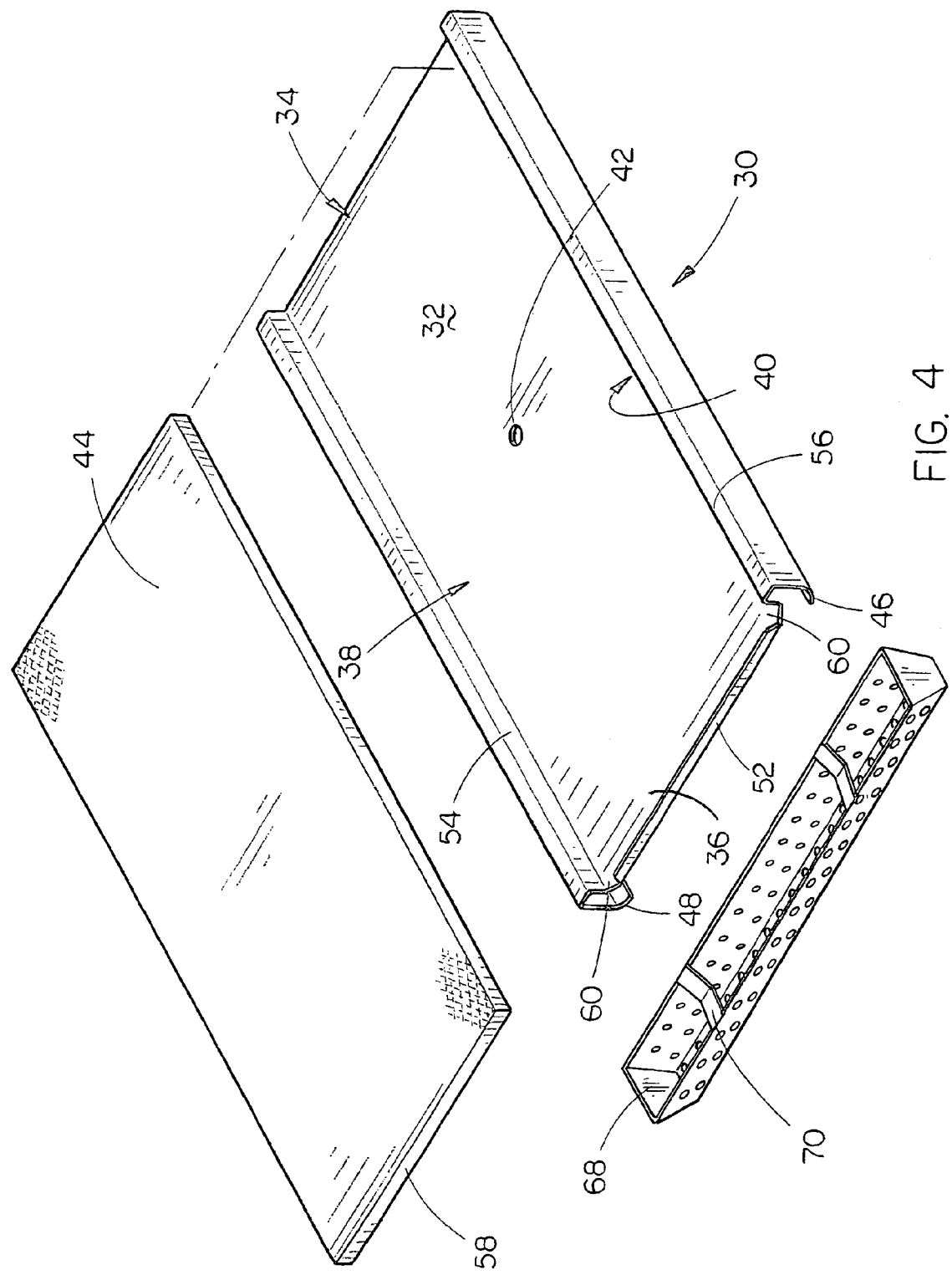
FIG. 4 is a perspective view of preferred embodiments of the trough basket and platform for use with the apparatus for washing animals of the present invention.
Figure 5:
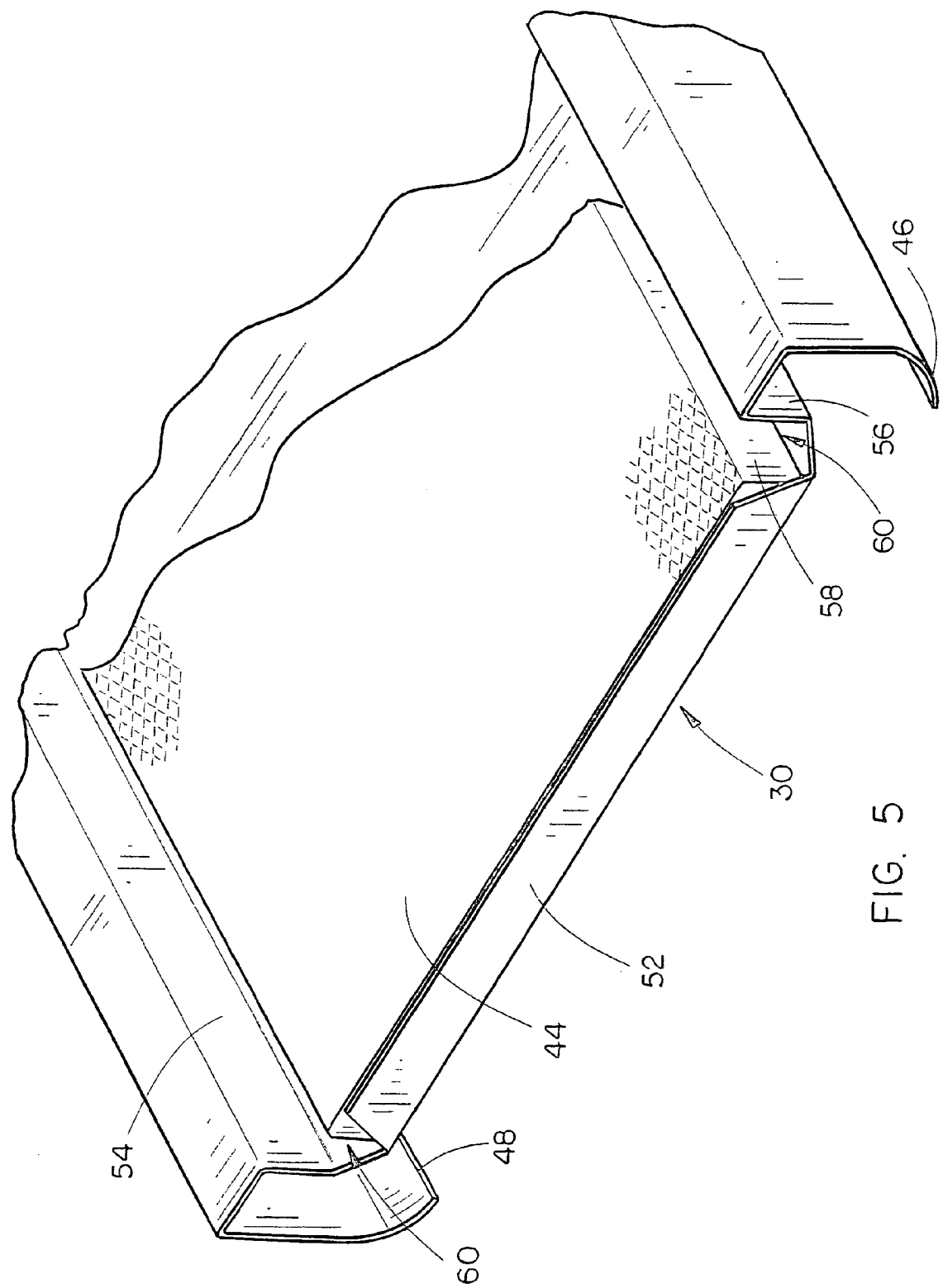
FIG. 5 is a perspective view of the platform of FIG. 4 in a preferred assembled embodiment.

To prevent the hair or other debris from entering the trough 62 and clogging the recirculating pump 64, it is contemplated that a screen 66, having a shape and size approximate to the opening of the trough 62, could be provided. However, a trough basket 68, having a shape and size approximate to that of the trough 62, could be provided as depicted in FIG. 4. The trough basket 68 is snugly received within the trough 62 to substantially prevent the hair and other debris from clogging the drain 50. At least one handle member 70 is preferably secured to the trough basket 68 so that the same can be easily removed from the trough 62 for the removal of its contents.

Figure 3:
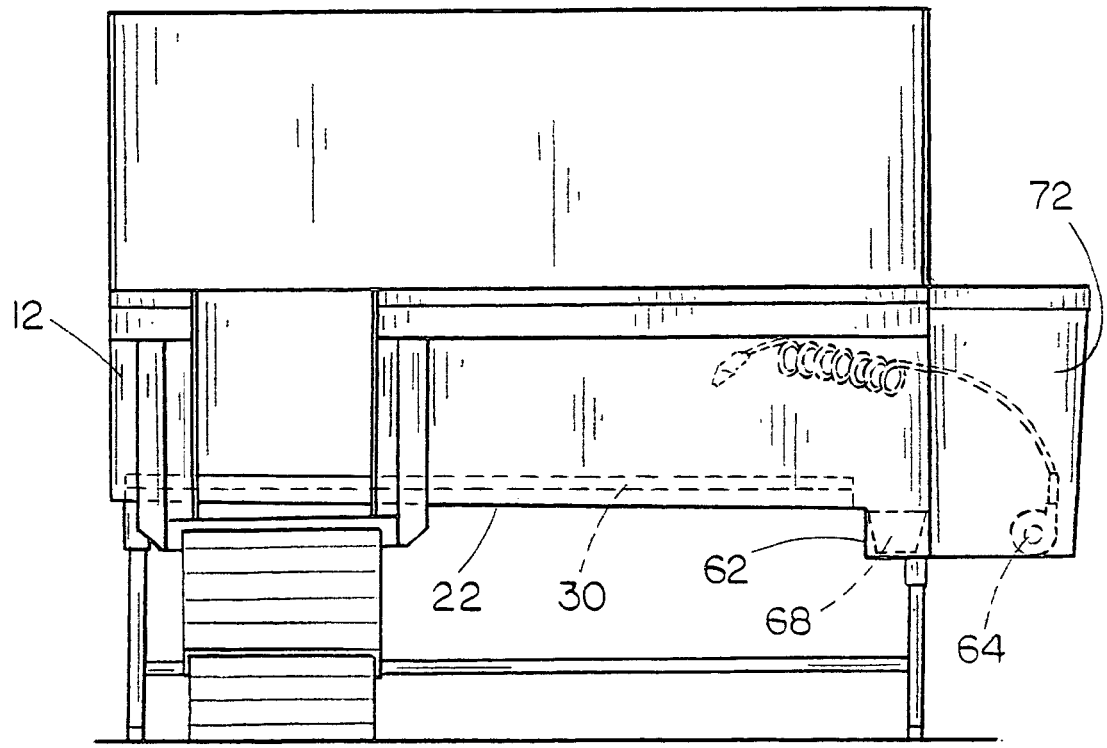
FIG. 3 is a front elevation view of the apparatus for washing animals of FIG. 1.
Figure 7:
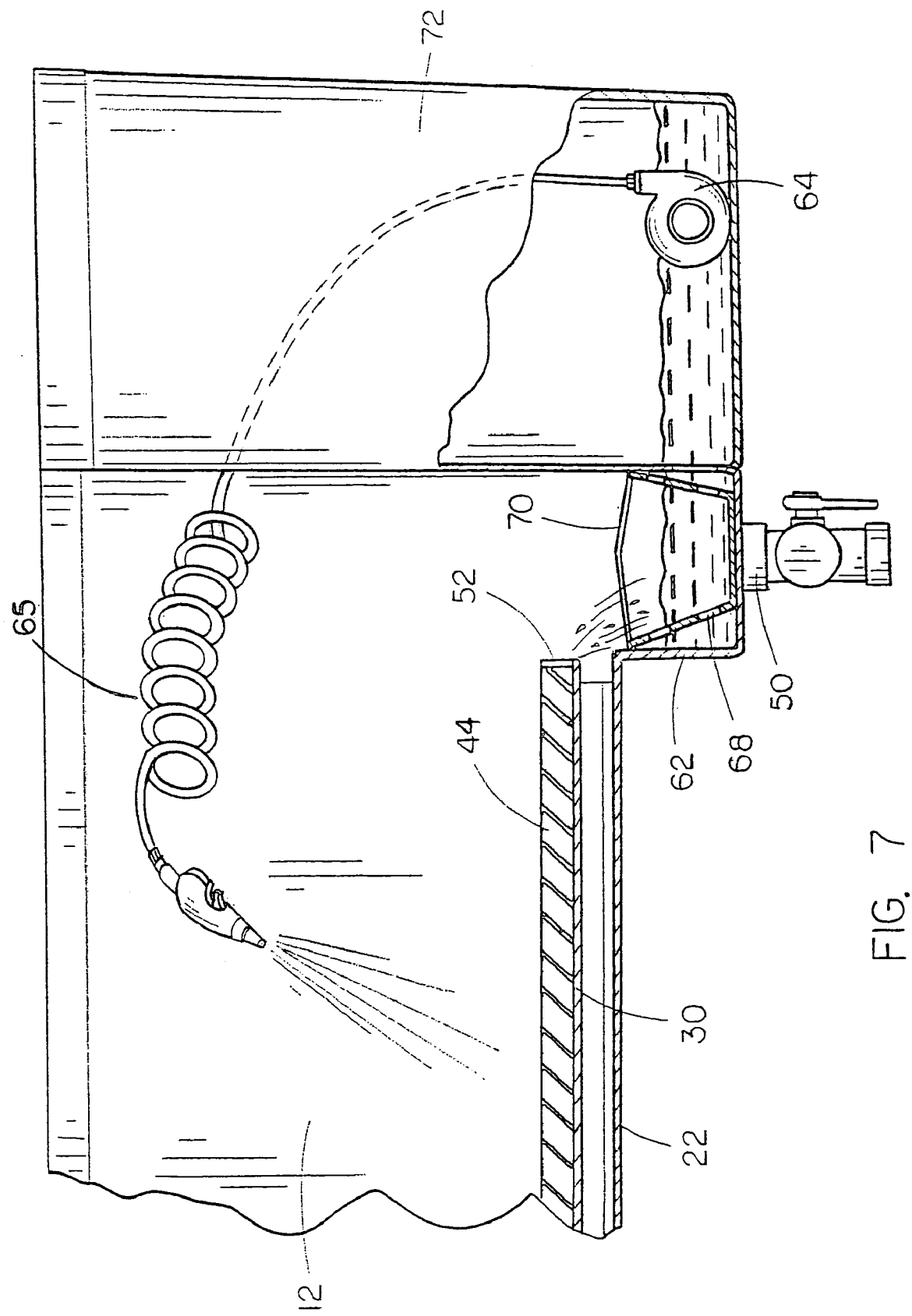
FIG. 7 is a partial cutaway view of the apparatus for washing animals of FIG. 1.

In another preferred embodiment, depicted in FIGS. 1, 3 and 7, an external well 72 is coupled to the container 12 adjacent the trough 62. The external well 72 extends below the level of the bottom portion 22 of the container 12. The external well 72 is formed to be in open communication with the trough 62 so that the washing liquid will collect in both structures simultaneously. A screen, such as the trough basket 68, will substantially prevent the hair and other debris from traveling into the external well 72 from the trough 62 during a washing operation. The external well 72 further provides a structure to house the recirculating pump 64 or other such functional equipment. This allows the user to direct liquid from the trough toward the animal via at least one fluid line 65 to wash the animal without concerns that the animal will interfere with or potentially damage the recirculating pump or other such equipment that is disposed within the container 12. It is contemplated that the shape and size of the external well 72 will be apportioned according to the needs of the individual application, such as the volume of washing liquid to be used, as well as the size of the recirculating pump or other equipment which is to be segregated from the animal.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. An apparatus for washing an animal with a liquid, comprising:
    a container having opposite end portions, opposite side portions and a bottom portion;
    a trough being positioned adjacent said bottom portion;
    a platform having opposite end portions, opposite side portions and an upper surface; said platform being operatively coupled to the bottom portion of said container so that said platform is vertically spaced from the bottom portion of said container; and
    a pad having upper and lower surfaces and a peripheral edge; said pad being operatively coupled to the upper surface of said platform to support the animal thereon so that the liquid is allowed to flow from the animal to the upper surface of said pad and onto the platform;
    said opposite side and end portions of said platform being shaped to allow the liquid to flow from said platform to the bottom portion of said container.

2. The apparatus of claim 1 further comprising a plurality of legs extending downwardly from said platform and operatively engaging the bottom portion of said container.

3. The apparatus of claim 1 further comprising at least one end lip extending upwardly from at least one of said opposite end portions of said platform; said at least one end lip being shaped to resist horizontal movement of said pad in at least one direction.

4. The apparatus of claim 1 further comprising at least one side lip extending upwardly from at least one of said opposite side portions of said platform; said at least one side lip being shaped to resist horizontal movement of said pad in at least one direction.

5. The apparatus of claim 1 further comprising opposite side lip portions extending upwardly from the opposite side portions of said platform and at least one end lip extending upwardly from at least one of said opposite end portions of said platform.

6. The apparatus of claim 1 further comprising at least one opening formed in the upper surface of said platform.

7. The apparatus of claim 1 wherein said bottom portion is at least slightly sloped from horizontal so that the liquid will flow from said bottom portion and into said trough when the liquid engages said bottom portion of said container.

8. The apparatus of claim 7 further comprising a recirculating pump disposed within said trough; said recirculating pump being operatively coupled to at least one fluid line to direct the liquid from the trough toward the animal.

9. The apparatus of claim 7 further comprising a screen extending across said trough so that debris is collected by said screen before the fluid is recirculated.

10. The apparatus of claim 8 further comprising a trough basket having a plurality of openings formed therein; said trough basket having a shape and size approximate to said trough so that said basket can be received within said trough and collect debris before debris enters said recirculating pump.

11. The apparatus of claim 7 further comprising an external well coupled to said container adjacent said trough; said external well being in open communication with said trough to allow the liquid to pass between said trough and said external well.

12. The apparatus of claim 11 further comprising a recirculating pump disposed within said external well; said recirculating pump being operatively coupled to at least one fluid line to direct the liquid from said external well to the animal.

13. An apparatus for washing at least one animal with a liquid, comprising:
- a container having opposite side portions, opposite end portions and a bottom portion;
- a trough operatively connected to and positioned at least slightly below said bottom portion of said container; said bottom portion of said container being at least slightly sloped from horizontal so that the liquid will tend to flow from said bottom portion into said trough; and
- a generally planar platform operatively connected to the bottom portion of said container to support the at least one animal within said container.

14. The apparatus of claim 13 further comprising a pad operatively connected to said platform; said pad being formed of a resilient and water-resistant material.

15. The apparatus of claim 13 further comprising means for filtering the liquid in the trough.

16. The apparatus of claim 13 further comprising a recirculating pump, disposed within said trough; said recirculating pump being operatively coupled to at least one fluid line to direct the liquid from said trough to the at least one animal.

17. The apparatus of claim 15 further comprising an external well coupled to said container adjacent said trough; said external well being in open communication with said trough to allow the liquid to pass between said trough and said external well.

18. The apparatus of claim 17 further comprising a recirculating pump disposed within said external well; said recirculating pump being operatively coupled to at least one fluid line to direct the liquid from said external well to the animal.

19. An apparatus for washing at least one animal with a liquid, comprising:
- a container having opposite side portions, opposite end portions and a bottom portion;
- means for collecting the liquid being operatively connected to and positioned at least slightly lower than the bottom portion of said container; and
- means for supporting the at least one animal within said container above the bottom portion of said container.

20. The apparatus of claim 19 further comprising means for filtering liquid from said means for collecting the liquid; said means for filtering liquid being operatively coupled to said means for collecting the liquid.

21. The apparatus of claim 19 further comprising means for delivering liquid within said means for collecting the liquid to a point of use adjacent the at least one animal; said means for delivering liquid being at least partially disposed within said means for collecting the liquid.

* * * * *